(12) United States Patent
Petty

(10) Patent No.: US 6,615,215 B1
(45) Date of Patent: Sep. 2, 2003

(54) METHOD FOR GRADUATED LOAD SENSITIVE TASK DISPATCHING IN COMPUTING SYSTEM

(75) Inventor: W. Clinton Petty, Reston, VA (US)

(73) Assignee: CommerceQuest Inc., Tampa, FL (US)

( * ) Notice: Subject to any disclaimer, the term of this patent is extended or adjusted under 35 U.S.C. 154(b) by 0 days.

(21) Appl. No.: 09/527,247

(22) Filed: Mar. 17, 2000

(51) Int. Cl.$^7$ .............................................. G06F 17/30
(52) U.S. Cl. ....................................................... 707/101
(58) Field of Search ................................ 707/100, 101; 709/102, 226, 231, 201, 313, 314, 319; 372/232, 412; 370/252; 375/214

(56) References Cited

U.S. PATENT DOCUMENTS

| | | | | |
|---|---|---|---|---|
| 4,918,687 A | * | 4/1990 | Bustini et al. | 370/235 |
| 4,945,548 A | * | 7/1990 | Iannarone et al. | 375/214 |
| 6,023,722 A | * | 2/2000 | Colyer | 709/201 |
| 6,167,032 A | * | 12/2000 | Allison et al. | 370/252 |

* cited by examiner

Primary Examiner—Diane D. Mizrahi
Assistant Examiner—Apu M Mofiz
(74) Attorney, Agent, or Firm—Foley & Lardner

(57) ABSTRACT

A system and method for a dynamic response to trigger messages and high and low performance event messages supports a graduated dispatching of tasks for processing messages in a queue. As messages are enqueued, queue attributes are altered, including an override of the standard flip-flop behavior of the queue depth high and low event statuses. The alteration of the queue attributes creates a bracketing at the point at which the last event occurred with a pair of "tripwires." The tripwires are continuously kept on either side of the queue depth at which the last performance event was generated. When the depth changes enough to cause the depth to cross one of the tripwires, the tripwires are moved, and dispatching of tasks for processing messages in the queue may be executed or any other logic deemed useful that is sensitive to queue depths.

25 Claims, 3 Drawing Sheets

METHOD FOR GRADUATED LOAD SENSITIVE TASK DISPATCHING IN COMPUTING SYSTEM

This application is based on provisional application Ser. No. 60/125,021 filed Mar. 18, 1999.

FIELD OF THE INVENTION

The invention relates generally to the field of message processing, and more specifically, to a system and method for adjusting the processing of messages according to changes in queue depth.

BACKGROUND OF THE INVENTION

MQSeries™, which is a product of the International Business Machines Corp. (IBM), performs message queuing and transport within and among a large variety of computer system types and networks. This product enables a computer program to place (enqueue) a data message into a named queue, the data message generally being picked up by another computer program. It is also possible that the queue designated as the target of the enqueue actually resides in a different physical computer. In this case, MQSeries accepts the enqueue request into the local system and then asynchronously transmits the message via a network to the remote system in which the queue is actually found. The message may then be dequeued by a program on that system. As described above, MQSeries enables different computer programs to exchange information via messages on queues and to maintain ignorance of where the recipient of a sent message is or the type of network implemented between the host machines.

In addition to this primary functionality, there are several ancillary features that aid in the use and management of MQSeries. Among these ancillary features are the performance event message feature and the trigger feature.

The performance event message feature is designed to report a "significant" change in the depth of a queue, where the depth of the queue corresponds to the number of messages in the queue. What constitutes a significant change is determined by a combination of settings, described below, which may be specified by a system administrator in MQSeries. The settings are attributes of all "local" queues, which are queues that actually hold or can hold messages.

A first of these attributes of a queue is a maximum depth attribute. This attribute sets the maximum number of messages that a queue can hold. After the maximum is reached, no more enqueues, i.e. placement of messages, will be accepted into the queue. Another attribute of each queue is a queue depth high percentage attribute. This attribute sets a percentage of the maximum depth value that is recognized as a high threshold. If the depth of the queue equals or exceeds the number of messages represented by this value, the queue is a candidate for generation of a performance event-high message.

The value of a queue depth high event status attribute determines whether to check if the high threshold has been reached. This attribute is a flag value that can be set to enabled or disabled. If the flag is enabled, then a performance event-high message will be generated whenever the number of messages in the queue reaches or exceeds the high threshold, which corresponds to the percentage of the maximum depth set by the queue depth high percentage. If the status is set to disabled, however, the performance event-high message will be suppressed. Anytime a performance event-high message is generated, the queue depth high event status attribute is automatically set to disabled, and a queue depth low event status attribute, described below, is set to enabled.

Like the high threshold attributes, MQSeries also maintains attributes for a low threshold. Among the low threshold attributes is a queue depth low percentage attribute, which sets a low threshold as a percentage of the maximum depth value described above. If the depth of a queue is equal to or less than the low threshold, the queue is a candidate for generation of a performance event-low message.

Each queue also has a queue depth low event status attribute. This attribute represents a flag value that can be set to enabled or disabled. If the flag is enabled, then a performance event-low will be generated whenever the number of messages in the queue is less than or equal to the low threshold, which corresponds to the percentage of the maximum depth set by the queue depth low percentage. If the status is set to disabled, the event will be suppressed. Anytime a performance event-low message is generated, the queue depth low event status attribute is automatically set to disabled, and the queue depth high event status attribute is set to enabled.

In addition to these local queue attributes, MQSeries implements special facilities for the delivery of events to a monitoring computer program. Part of this implementation is a performance event queue. The performance event queue is a specially named local queue into which MQSeries places performance event messages, such as the performance event-low and performance event-high messages. There is only one performance event queue in each executing instance of MQSeries. If a program wishes to receive the messages placed in the performance event queue, the program opens the queue and waits for the messages to appear using the same application programming interfaces (APIs) provided by MQSeries for use in dequeuing messages from any of its local queues. The performance event messages are enqueued synchronously to the performance event queue with the messaging event, such as an enqueue or dequeue on some queue that caused the performance event message to be generated.

A typical use of the above features can be exemplified with a queue defined with the following attributes: maximum depth set to one thousand; queue depth high percentage set to ten; and queue depth high event status set to enabled. With maximum depth set to one thousand and queue depth high percentage set to 10, the high threshold is 100. In addition, queue depth low percentage is set to one, and queue depth low event status is set to disabled. With queue depth low percentage set to 1, the low threshold is 10.

As messages first begin to arrive in the queue, no performance event is recognized. Although the queue is a candidate for a performance event-low each time an enqueue occurs and the resulting queue depth is ten or less, the event is suppressed because the queue depth low event status is disabled. When the queue's depth reaches one hundred, the queue becomes a candidate for generation of a performance event-high message. This performance event message will be generated because the queue depth high event status is enabled. At the same time the performance event message is generated, the queue depth high event status will be set to disabled, and the queue depth low event status will be set to enabled. If over time the depth of the queue drops back to ten or less, then the performance event-low message will be generated, the queue depth low event status will be disabled, and the queue depth high event status will be re-enabled.

As demonstrated by the above example, the queue depth high event status and the queue depth low event status are designed to operate in a flip-flop manner, such that when one is enabled, the other is disabled and vise versa. This flip-flop manner supports a model often used in many computer system management products, in which various managed resources are seen as being either in an alertable state or a normal state. If the resource was included as an item in a management display panel, the visual representation of the resource may, for example, change its color to red when in an alertable state, and then back to green when the state returns to normal. When the alertable state is displayed, computer operations procedures may be invoked as a response to the state with the intent of returning the resource to a normal state.

While this behavior is well suited to a systems management model for resource monitoring, it is not well suited for a task dispatching monitoring model. MQSeries provides a trigger feature for task dispatching. There is no coordination, however, between the performance event message feature and the trigger feature in the MQSeries product.

With respect to the trigger feature, MQSeries employs a set of facilities for starting computer programs when queues become active, such as when messages have arrived in a queue, with the intent that the computer programs can dequeue and process the messages that have arrived. An instance of such a computer program in execution is referred to herein as a "task." The following are the key elements of the trigger feature.

A first of these key elements is a trigger message. The trigger message is a specially formatted message generated by MQSeries, which indicates that a local queue has become "active." The trigger message is defined with attributes indicating that a task is supposed to startup and process the messages arriving in the local queue.

An initiation queue is an otherwise ordinary local queue, which is designated by the system administrator as being the target of MQSeries generated trigger messages related to one or more local queues. The initiation queue is analogous to the performance event queue discussed above. Any local queue supported by triggering facilities must be related to a respective initiation queue so that MQSeries will know where to deliver any trigger messages that are generated in conjunction with that local queue. A trigger Monitor is a computer program that monitors information generated by MQSeries for use in dispatching tasks to process messages arriving in queues.

MQSeries supports three types of triggering. A first trigger means that a trigger message should be generated when the queue goes from empty to non-empty if no tasks are currently executing in association with the queue. A depth trigger means that a trigger message should be generated when the queue reaches a specific depth if no tasks are currently executing in association with the queue. An every trigger means that a trigger message should be generated every time a new message is enqueued to the queue.

Both the first and depth trigger types respond to the queue reaching a certain predefined condition to trigger the generation of a single trigger message. Assuming a task is started in response to the generated trigger message, no further trigger messages will be generated because the presence of even one task dequeuing messages from the queue will suppress further trigger message generation based upon the first and depth trigger types.

The every trigger type causes a trigger message to be generated every time a new message is enqueued to the queue. Even if an existing task immediately dequeues a newly arrived message, a trigger message will still be created by the every trigger when the message arrives. These three trigger types have a static behavior. As a result, the number of tasks started in association with a queue cannot be related intelligently to the current enqueue/dequeue rates experienced by the queue.

SUMMARY OF THE INVENTION

Briefly, consistent with the present invention, a method for detecting and reacting to changes in depth of one or more queues which store messages processed by tasks executing in a computer system sets a high threshold of a depth of the queue to a first value and detects when the depth of the queue equals or exceeds the high threshold. The high threshold is raised by a predetermined increment each time the depth of the queue equals or exceeds the high threshold.

In another aspect of the invention, a method for detecting and reacting to changes in depth of one or more queues which store messages processed by tasks executing in a computer system stores messages processed by tasks executing in a computer system starts at least one task for processing one or more messages stored in a queue. A high threshold of a depth of the queue is set to a first value. At least one additional task for processing the messages in the queue is started if the depth of the queue equals or exceeds the high threshold set to the first value.

DETAILED DESCRIPTION OF THE PREFERRED EMBODIMENT

The present invention will be described in the context of a specific embodiment, but the invention is not intended to be so limited.

A system and method consistent with the present invention enables a dynamic response to trigger messages and high and low performance event messages and supports a graduated dispatching of tasks for processing messages in a queue. As messages are enqueued, queue attributes are altered, including an override of the standard flip-flop behavior of the queue depth high and low event statuses. If a standard flip-flop toggling of the status of the high and low performance events is used, a system cannot dispatch tasks in a graduated manner. Given that a queue's depth is seen to move in steps, with the number and size of these steps under administrative control and with monitoring logic able to re-evaluate the queue's dispatching needs at each step, it is possible to alter queue attributes to create a bracketing at the point at which the last event occurred with a pair of "tripwires." The tripwires are continuously kept on either side of the queue depth at which the last performance event was generated. When the depth changes enough to cause the depth to cross one of the tripwires, the tripwires are moved, and dispatching or any other useful logic may be executed.

Figure 1:
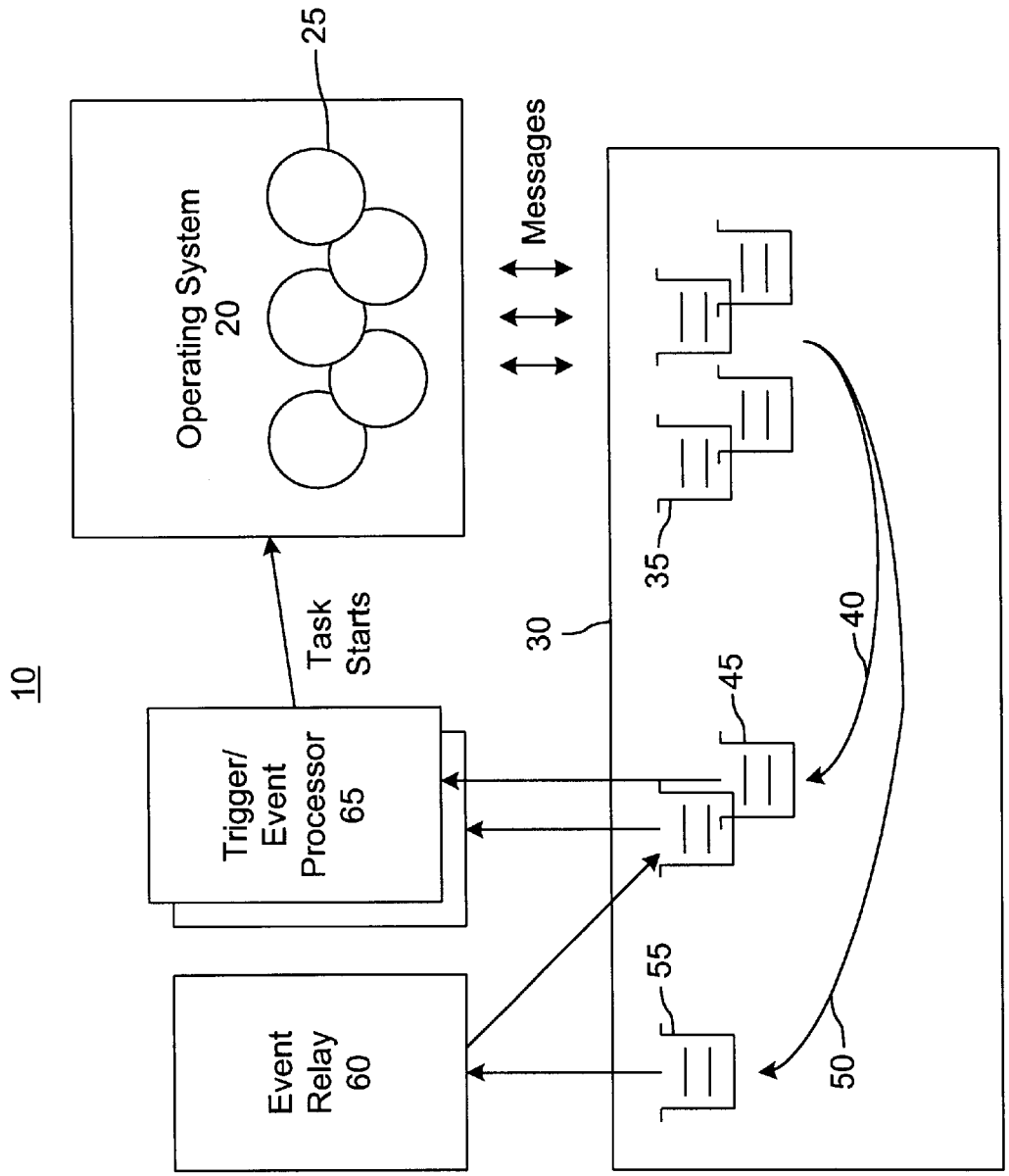
FIG. 1 is a block diagram of a task dispatching system consistent with the present invention.

FIG. 1 is a block diagram of a task dispatching system 10 consistent with the present invention. As shown in FIG. 1, the task dispatching system 10 includes an operating system 20 in which one or more processing tasks 25 are executing. The processing tasks 25 are computer programs that dequeue and process the messages that have arrived in the queues where each instance of such a computer program in execution is referred to as a task. The processing tasks 25 dequeue and process messages found on the queues for which they are associated. It is also possible that the processing tasks generate messages to be transferred to other tasks and programs executing in operating system 20 or in an operating system outside of the task dispatching system 10. The generated messages, if any, are passed to a message transfer system 30. The message transfer system 30 is preferably implemented using MQSeries.

The messages transferred to the message transfer system 30 are placed into one of a plurality of queues 35. As messages are placed into the queues 35, or arrive from other systems, various event messages may be generated. These event messages include trigger messages 40, which are stored in one of a plurality of initiation queues 45, and performance event messages 50, which are stored in a performance event queue 55. In general, there are more queues 35 than initiation queues 45, such that each initiation queue preferably services a plurality of queues 35. The performance event queue 55 passes the performance event messages 50 to an event relay 60. The event relay 60 takes the performance event messages 50 from the performance event queue 55 and transfers them to the initiation queue 45 corresponding to the queue 35 generating the performance event message 50. The trigger messages, as well as the performance event messages passed by the event relay 60, that are stored in the initiation queues 45 are passed to a respective one of a plurality of trigger event processors 65. Each instance of an initiation queue 45 corresponds with a respective one of the trigger event processors 65.

The trigger event processors 65, in response to the event messages received from the initiation queues 45, determine whether or not a task should be generated to process the messages in the queue 35 that generated the event message. To make this determination, the trigger event processors 65 look at attributes associated with the queue 35. Depending upon these attributes, the trigger event processors 65 may issue a task start instruction to have one or more additional tasks assigned to process the messages in the queue 35.

The following is an example of an environment in which the task dispatching system 10 may be implemented. In this example, a program supports a webpage where a user can enter a query. When the user submits the query, the program supporting the web page takes the data transmitted from the browser, and builds a message, such as an MQSeries message. This message is then enqueued on the machine running the web-server and transferred to the machine in which the program supporting the query against the desired data is deployed. A processing task 25 that can process the desired query, if not already running, is started in response to a trigger message. The processing task 25 dequeues the message and sends a response message back to the still-waiting web-server program via some other queue 35. As the volume of these queries rises, an increased number of processing tasks 35 for dequeuing and processing the queries can be started in proportion to the volume, increasing overall throughput.

In a system and method consistent with the present invention, the monitoring of the depth of the queues 35 allows for a graduated response to traffic loads of the queues. As events are generated according to the monitoring of the queue depth, additional tasks may be started, for example, as the depth of the queue rises through successive incremental increases in depth. If the depth starts to fall or a maximum number of tasks allowed for the queue is reached, then the starting of further tasks may be suppressed. This graduated response can be implemented, for example, in a program that receives trigger messages and performance event messages, as discussed above, which are used to intelligently dispatch tasks in a manner consistent with the needs of the queues involved.

In addition to the attributes and elements of the performance event message feature and the trigger feature discussed above, a system and method consistent with the present invention defines the following attributes relative to a queue 35 being monitored. To avoid having a task generated for every enqueue of a message in a queue 35, it is preferable that the first and/or depth trigger type is used.

A first of these additional attributes is a task trigger increment. When a trigger event processor 65 detects that additional tasks are needed to process the incoming messages, the value of the task trigger increment determines how many tasks will be started. In a simple approach, the value may be a static number of tasks. However, a more sophisticated heuristic approach in which the enqueue/dequeue rates are analyzed may be used to determine the value of the task trigger increment so as to optimize tasking. This analysis for determining an optimum tasking is possible because the performance event messages include enqueue/dequeue counts for a specified interval of time.

A trigger threshold indicates a change in queue depth that should be considered as significant to the trigger event processor 65. The value of the trigger threshold is expressed as a percentage of the maximum queue depth attribute of the queue. For example, if a queue's maximum queue depth is one thousand, then a value of one for this attribute would cause the trigger event processor 65 to re-evaluate the processing of the queue whenever its depth passes a multiple of ten messages, which equals 1 percentage of 1000 messages.

Maximum tasks sets a limit on the number of tasks that may be used to process the messages of a queue. When the number of tasks running against a queue is equal to this parameter, then the trigger event processor 65 will not attempt to start any additional tasks, regardless of further depth increases. Like the task trigger increment, the value of maximum tasks may be a static number, but more sophisticated heuristic approaches may also be used.

Figure 2:
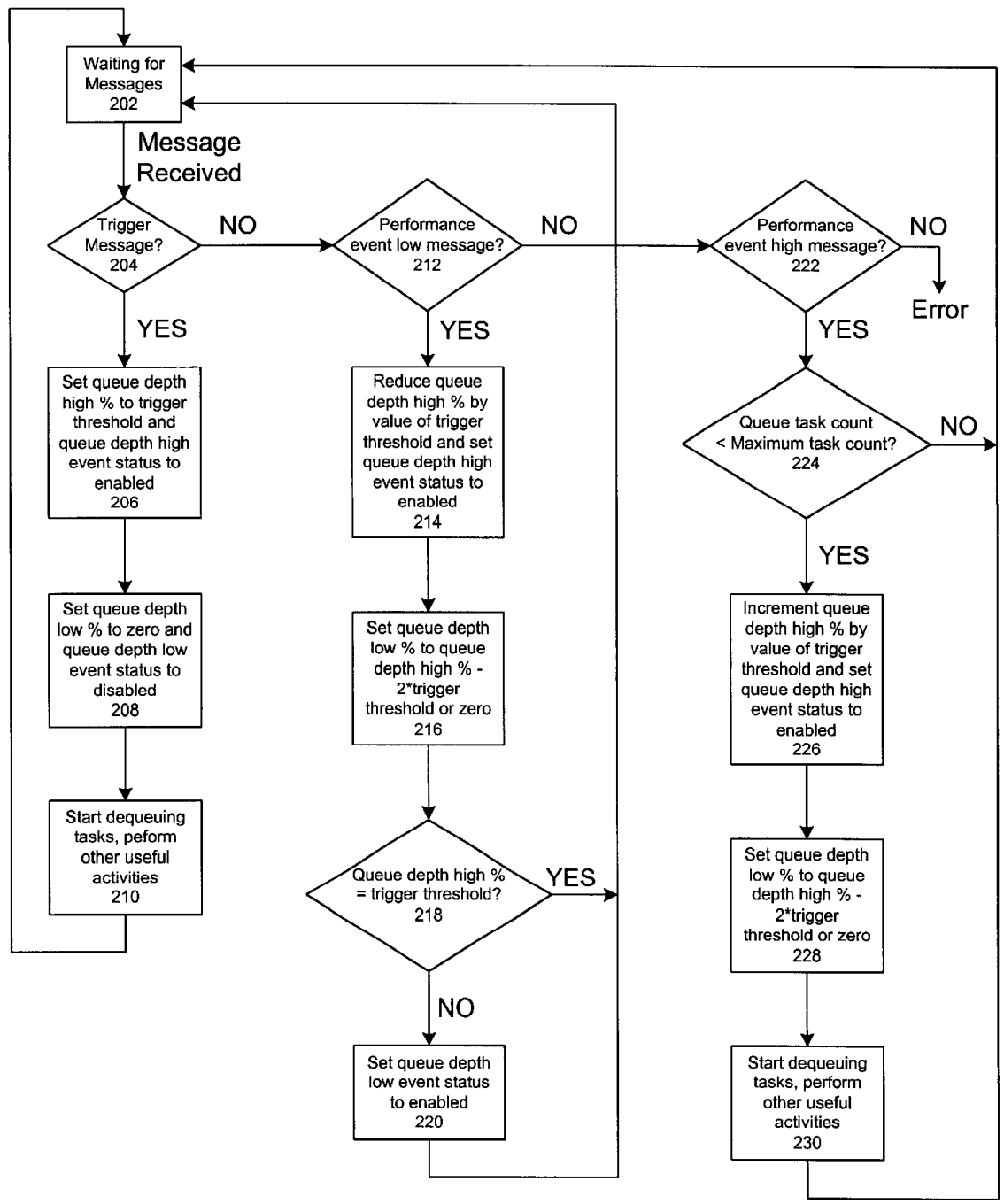
FIG. 2 is a block diagram flowchart of a task dispatching process consistent with the present invention.

FIG. 2 is a flow diagram of a task dispatching process consistent with the present invention. As shown in FIG. 2, the process starts in an idle state where the task dispatching process is waiting for a trigger message or a performance event message (step 202). When a message is received, it is first determined whether the message is a trigger message (step 204). This determination is preferably made by the trigger event processor 65. The trigger message may have been generated based upon a first trigger type in response to a message being stored in an empty queue.

If the message is a trigger message, the trigger event processor 65 sets the queue depth high percentage to the trigger threshold and sets the queue depth high event status to enabled (step 206). The trigger event processor 65 also sets the queue depth low percentage to zero and sets the queue depth low event status to disabled (step 208). Finally, the trigger event processor starts a number of tasks for processing the queue 35 which generated the trigger message (step 210). The number of tasks started corresponds to the task trigger increment, using either a simple static value, or a heuristically determined value.

If the message is not a trigger message, the trigger event processor 65 determines whether the message is a performance event low message (step 212). If the message is determined to be a performance event low message, the trigger event processor reduces the queue depth high percentage by subtracting the value of the trigger threshold from the current value of the queue depth high percentage attribute and the queue depth high event status is left as "enabled" because this event has no effect on it (step 214). The reduction in the queue depth high percentage lowers the level of this attribute by one increment of the trigger threshold. It is preferable for the queue depth high percentage to be maintained at a value no lower than the value of trigger threshold.

At the same time, the trigger event processor 65 sets the queue depth low percentage to a value that is at least two units of the trigger threshold below the current queue depth high percentage, but not less than zero (step 216). The trigger event processor then determines if the queue depth high percentage is equal to the trigger threshold (step 218). If they are equal, then processing returns to the idle state of waiting for a new message (step 202). However, if they are not equal, then the queue depth low event status is set to enabled (step 220). Normally, the queue depth low event status is set to disabled automatically in response to a performance event low message. Having both the queue depth low event status and queue depth high event status enabled at the same time overrides the normal inverse relationship between their settings. In general, no tasks are started as a result of a performance event low message because this message indicates that the number of tasks currently executing are dequeuing messages faster than new ones are being enqueued, making additional tasks unnecessary.

If the message is neither a trigger message nor a performance event low message, the trigger event processor 65 checks whether the received message is a performance event high message (step 222). If not, then there is an error. If the message is a performance event high message, the following steps are performed. First, the trigger event processor 65 determines if the number of tasks currently running to dequeue messages from the queue that generated the performance event high message is less than the maximum tasks attribute for the queue (step 224). This maximum tasks attribute may be statically defined attribute or a heuristically derived one.

If it is determined that the number of tasks is not less than the value indicated by the maximum tasks, then no alterations are made to the queue attributes and no new tasks are started. Instead, processing returns to the idle state of waiting for a new message (step 202). In addition to returning to the idle state, an alert may be generated to a systems management facility to notify operations staff that message enqueue rates are exceeding dequeue rates, and the trigger event processor 65 is no longer able to start additional tasks.

If the number of currently running tasks is less than the maximum tasks value, the trigger event processor 65 increments the queue depth high percentage by adding the value of the trigger threshold to the current value of the queue depth high percentage attribute and the queue depth high event status is set to enabled (step 226). This increase in the queue depth high percentage, in effect, raises the value of the attribute by one increment of the trigger threshold value. In addition, keeping the setting of the queue depth high event status as enabled overrides the normal behavior of disabling the queue depth high event status after receiving a performance event high message. As a result, the generation of a performance event high message is enabled for a higher threshold.

The trigger event processor also sets the queue depth low percentage to a value that is at least two units of the trigger threshold below queue depth high percentage, but not less than zero (step 228). The queue depth low event status is set to enabled automatically by the reception of the performance event high message. In addition to the alterations to the queue attributes, the trigger event processor 65 starts a number of tasks for processing the messages from the queue 35 which generated the trigger message (step 230). The number of tasks started corresponds to the task trigger increment, using either a simple static value, or a heuristically determined value.

Figure 3A:
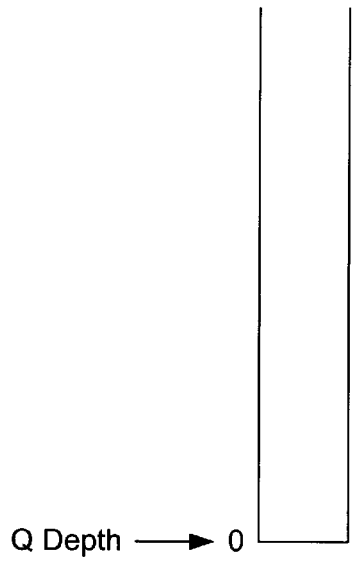
FIGS. 3A–3D are graphical representations of a queue

FIGS. 3A–3D show a graphical representation of a queue in a task dispatching process consistent with the present invention. For purposes of illustration, it is assumed that the maximum depth of the queue is 1000 and the trigger threshold is 1%, which equals 10 messages. FIG. 3A shows an idle queue having no messages. In this state, the performance event message attributes, including the queue depth high percentage, the queue depth low percentage, the queue depth high event status and the queue depth low event status are undefined.

Figure 3B:
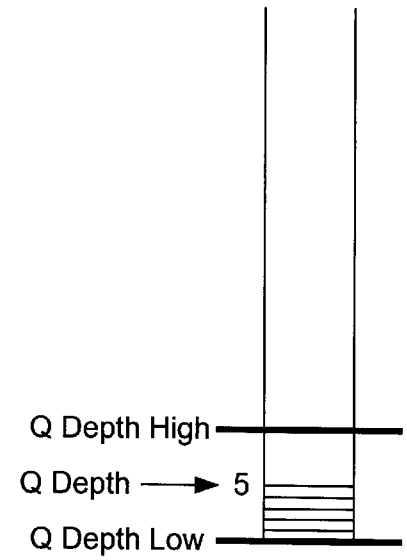

FIG. 3B shows the status of the queue after five messages have been enqueued in a queue. A trigger message is generated based upon the first trigger type in response to the first of the newly arrived messages. The trigger message causes the undefined performance event message attributes to be set. The queue depth high percentage is set to the trigger threshold of one percent (i.e., ten messages), the queue depth high event status is enabled, the queue depth low percentage is set to zero, and the queue depth low event status is disabled. In addition, the trigger event processor 65 starts a number of tasks for processing the messages present in the queue. The number of tasks started corresponds to the task trigger increment.

Figure 3C:
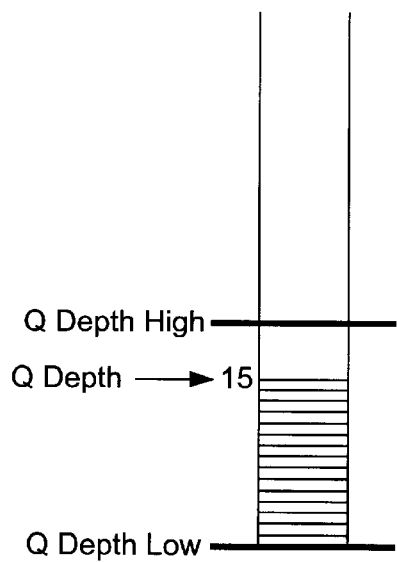

FIG. 3C shows the status of the queue after the number of messages stored in the queue has risen to fifteen. Since the number of stored messages has risen above ten, which corresponds to the queue depth high percentage, a performance event high message is generated. In response to the performance event high message, the queue depth high percentage is incremented by the value of the trigger threshold from one percent to two percent, and the queue depth high event status is enabled. At the same time, the queue depth low percentage is set to the higher of zero and a value equal to the queue depth high percentage minus two times the trigger threshold. Since the value of the queue depth high percentage has been set to two percent and two times the trigger threshold is also two percent, the queue depth low percentage remains at zero. In addition, the queue depth low event status is automatically enabled in response to the performance event high message. The trigger event processor 65 also starts a number of tasks corresponding to the task trigger increment, as long as the number of currently running tasks is less than the maximum tasks attribute.

Figure 3D:
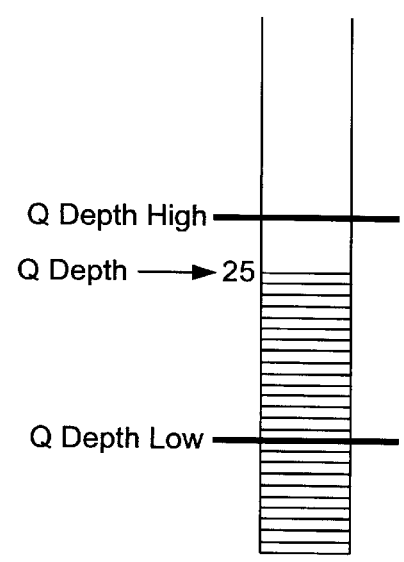

FIG. 3D shows the status of the queue after the number of messages stored in the queue has risen to twenty-five (25). Since the number of stored messages has risen above two percent (i.e., twenty messages), which corresponds to the queue depth high percentage, a performance event high message is generated. In response to the performance event high message, the queue depth high percentage is incremented by the value of the trigger threshold from two percent to three percent, and the queue depth high event status is enabled. At the same time, the queue depth low percentage is set to the higher of zero and a value equal to the queue depth high percentage minus two times the trigger threshold. Since the value of the queue depth high percentage has been set to three percent and two times the trigger threshold is two percent, the queue depth low percentage is set to one percent (i.e., ten messages). In addition, the queue depth low event status is automatically enabled in response to the performance event high message. The trigger event processor 65 again starts a number of tasks corresponding to the task trigger increment, as long as the number of currently running tasks is less than the maximum tasks attribute.

If the depth of the queue then dropped below ten, a performance event low message would be generated. In response to the performance event low message, the queue depth high percentage would be reduced by the value of the trigger threshold from three percent to two percent. The queue depth high event status would be enabled automatically in response to the performance event low message. At the same time, the queue depth low percentage would be set to the higher of zero and a value equal to the queue depth high percentage minus two times the trigger threshold. Since the value of the queue depth high percentage has been set to two percent and two times the trigger threshold is also two percent, the queue depth low percentage would be set to zero. In addition, since the queue depth high percentage is greater than the trigger threshold, the queue depth low event status would be enabled. No new tasks are started, nor are any tasks discontinued. However, it would be possible to have the task dispatching process remove tasks in response to performance event low messages.

As demonstrated by the queue example described in FIGS. 3A–3D, by moving the event levels (tripwires) up and down with increases and decreases in depth, the system is kept sensitive to further changes in depth since the levels stay close to one trigger threshold of the current depth. As a result, a material increase or decrease in queue depth can be detected promptly.

A further variation on the responses to the queue depth changes may be to use a flexible trigger threshold which is adjusted based on, for example, the current depth of the queue as a percent of the maximum depth. With this approach, the trigger threshold may be smallest when the queue depth is low, and then increase as the queue depth increases, since at higher queue depths there should be more total tasks running, making the threshold larger where depth changes are significant.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and a practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for detecting and reacting to changes in depth of one or more queues which store messages processed by tasks executing in a computer system, comprising:
    setting a high threshold of a depth of the queue to a first value;
    setting a low threshold of a depth of the queue to a second value lower than the first value;
    detecting when the depth of the queue equals or exceeds the high threshold;
    raising the high threshold by a predetermined increment each time the depth of the queue equals or exceeds the high threshold; and
    selectively adjusting the low threshold when the depth of the queue equals or exceeds the high threshold.

2. A method according to claim 1, further comprising:
    starting at least one task for processing one or more messages stored in the queue each time the depth of the queue equals or exceeds the high threshold.

3. A method according to claim 2, further comprising the steps of
    reducing the value of the high threshold if the depth of the queue is equal to or less than the value of the low threshold; and
    reducing the value of the low threshold if the depth of the queue is equal to or less than the value of the low threshold.

4. A method according to claim 1, further comprising:
    starting at least one task for processing one or more messages stored in the queue each time the depth of the queue equals or exceeds the high threshold if the number of tasks currently processing the messages in the queue is less than a predetermined amount.

5. A method according to claim 1, further comprising stopping at least one task for processing one or more messages stored in the queue if the depth of the queue is equal to or less than the value of the low threshold.

6. A method according to claim 1, wherein the low threshold is raised when the depth of the queue equals or exceeds the high threshold and the high threshold is higher than a predetermined value.

7. A method for detecting and reacting to changes in depth of one or more queues which store messages processed by tasks executing in a computer system, comprising:
    starting at least one task for processing one or more messages stored in a queue;
    setting a high threshold of a depth of the queue to a first value;
    setting a low threshold of a depth of the queue to a second value lower than the first value;
    starting at least one additional task for processing the messages in the queue if the depth of the queue equals or exceeds the high threshold set to the first value; and
    stopping at least one task for processing one or more messages stored in the queue if the depth of the queue is equal to or less than the value of the low threshold.

8. A method according to claim 7, further comprising:
    raising the value of the high threshold if the depth of the queue equals or exceeds the high threshold set to the first value.

9. A method according to claim 8, further comprising:
    starting at least one additional task for processing the messages in the queue if the depth of the queue equals or exceeds the raised value of the high threshold.

10. A method according to claim 8, further comprising:
    starting at least one additional task for processing the messages in the queue if the depth of the queue equals or exceeds the raised value of the high threshold and the number of tasks currently processing the messages in the queue is less than a predetermined amount.

11. A method according to claim 7, further comprising:
    setting the high threshold to a third value lower than the first value if the depth of the queue is equal to or less than the low threshold set to the second value; and
    setting the low threshold to a fourth value lower than the second value if the depth of the queue is equal to or less than the value of the low threshold.

12. A method according to clam 1, further comprising stopping at least one task for processing one or more messages stored in the queue if the depth of the queue is equal to or less than the value of the low threshold.

13. A method according to claim 7, wherein the low threshold is raised when the depth of the queue equals or exceeds the high threshold and the high threshold is higher than a predetermined value.

14. A computer system for detecting and reacting to changes in depth of one or more queues which store messages processed by tasks executing in the computer system, comprising:

means for setting a high threshold of a depth of the queue to a first value;

means setting a low threshold of a depth of the queue to a second value lower than the first value;

means for detecting when the depth of the queue equals or exceeds the high threshold;

means for raising the high threshold by a predetermined increment each time the depth of the queue equals or exceeds the high threshold; and means for selectively adjusting the low threshold when the depth of the queue equals or exceeds the high threshold.

15. A computer system according to claim 14, further comprising:

means for starting at least one task for processing one or more messages stored in the queue each time the depth of the queue equals or exceeds the high threshold.

16. A computer system according to claim 14, further comprising the step of:

means for starting at least one task for processing one or more messages stored in the queue each time the depth of the queue equals or exceeds the high threshold if the number of tasks currently processing the messages in the queue is less than a predetermined amount.

17. A computer system according to claim 14, further comprising:

means for reducing the value of the high threshold if the depth of the queue is equal to or less than the value of the low threshold; and means for reducing the value of the low threshold if the depth of the queue is equal to or less than the value of the low threshold.

18. A computer system according to claim 14, further comprising means for stopping at least one task for processing one or more messages stored in the queue if the depth of the queue is equal to or less than the value of the low threshold.

19. A computer system according to claim 14, further comprising means for raising the low threshold when the depth of the queue equals or exceeds the high threshold and the high threshold is higher than a predetermined value.

20. A computer program stored on a computer readable medium for detecting and reacting to changes in depth of one or more queues which store messages processed by tasks executing in a computer system, the computer program configured to:

set a high threshold of a depth of the queue to a first value;

set a low threshold of a depth of the queue to a second value lower than the first value;

detect when the depth of the queue equals or exceeds the high threshold;

raise the high threshold by a predetermined increment each time the depth of the queue equals or exceeds the high threshold; and selectively adjust the low threshold when depth of the queue equals or exceeds the high threshold.

21. A computer program according to claim 20, further configured to:

start at least one task for processing one or more messages stored in the queue each time the depth of the queue equals or exceeds the high threshold.

22. A computer program according to claim 20, further configured to:

start at least one task for processing one or more messages stored in the queue each time the depth of the queue equals or exceeds the high threshold if the number of tasks currently processing the messages in the queue is less than a predetermined amount.

23. A computer program according to claim 20, further configured to:

reduce the value of the high threshold if the depth of the queue is equal to or less than the value of the low threshold; and reduce the value of the low threshold if the depth of the queue is equal to or less than the value of the low threshold.

24. A computer program according to claim 20, further configured to:

stop at least one task for processing one or more messages stored in the queue if the depth of the queue is equal to or less than the value of the low threshold.

25. A computer program according to claim 20, further configured to:

raise the low threshold when the depth of the queue equals or exceeds the high threshold and the high threshold is higher than a predetermined value.

* * * * *